United States Patent Office 3,424,801
Patented Jan. 28, 1969

3,424,801
METHOD FOR IMPROVING THE OXIDATION RESISTANCE OF POLYPHENYL ETHER
Emil H. Carlson, Kirkwood, Mo., assignor to Monsanto Company, St. Louis, Mo., a corporation of Delaware
No Drawing. Continuation-in-part of application Ser. No. 102,662, Apr. 13, 1961. This application Mar. 14, 1966, Ser. No. 533,814
The portion of the term of the patent subsequent to Mar. 13, 1983, has been disclaimed
U.S. Cl. 260—613    12 Claims
Int. Cl. C10m 7/26; C09k 3/02

This is a continuation-in-part application of my copending application Ser. No. 102,662, filed Apr. 13, 1961, now U.S. Patent No. 3,240,817.

This invention relates to the treatment of polyphenyl ether compositions by heating with a metal from a group consisting of alkali metals or copper metal, and each class of metals is employed in the absence of the other, to improve their oxidation resistance, color stability, and corrosive action.

The polyphenyl ether compositions have been found to have physical and chemical properties whereby they are particularly suitable as high-temperature functional fluids, i.e. they have excellent thermal stability, excellent oxidation stability, very good hydrolytic stability, excellent liquid range, fair pour point, good lubricity, good viscosity properties, very good radiation stability, and excellent useful life at elevated temperatures of the order of about 800° F. and higher.

The polyphenyl ethers can be illustrated by the structural formula

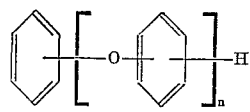

wherein $n$ is an integer from 2 to 9, and hydrocarbyl derivatives thereof wherein the number of carbon atoms in a single hydrocarbyl radical preferably does not exceed 12 and the total carbon atoms in the sum of the hydrocarbyl radicals preferably does not exceed 25, and mixtures of such polyphenyl ethers. The hydrocarbyl-substituted polyphenyl ethers preferably contain hydrocarbyl substituents wherein the carbon atom bonding said substituent to an aromatic nucleus of the polyphenyl ether is free from hydrogen atoms, for example, t-butyl, t-amyl, 1-methylcyclohexyl, α-cumyl, and like hydrocarbyl radicals. For use under extreme conditions of temperature and/or ionizing radiation the unsubstituted polyphenyl ethers are generally preferred. Furthermore the aforesaid polyphenyl ethers, as a substantially single component, preferably have all of the ether linkages in the meta position. When mixtures of polyphenyl ethers are employed it is preferred that such composition contain at least about 50 weight percent of all-meta polyphenyl ethers. However, as an alternative condition of such compositions, a major proportion of meta-linkages in the sum of the polyphenyl ether components comprising such composition is preferred, i.e. the ether meta-linkages in any mixed composition should preferably be of the order of at least about 50 percent of the total ether linkages in said mixed composition. Additionally, as to polyphenyl ethers containing other than meta linkages, the nonsymmetrical isomer components are generally preferred over the symmetrical isomer components. Furthermore, whereas ortho, meta and para ether linkages can be employed in the polyphenyl ether compositions, the linkages preferably are predominately the meta and para ether linkages. A further preferred condition is that the polyphenyl ethers are selected such that $n$ is an integer from 3 to 6 and more preferably still from 3 to 4.

The various polyphenyl ethers and mixed compositions thereof are more fully disclosed and claimed in the copending applications of Edward S. Blake and William C. Hammann, Ser. No. 101,081, filed Apr. 6, 1961, now abandoned; Ser. No. 843,057, filed Sept. 29, 1959, now U.S. Patent 3,155,888; Ser. No. 766,685, filed Oct. 13, 1958; and Ser. No. 702,767, filed Dec. 16, 1957 now abandoned; all of which applications are incorporated herein by reference.

The principal object of the instant invention is to prepare polyphenyl ether functional fluid compositions having improved oxidation resistance. Another object of the instant invention is to further reduce the corrosive action of the polyphenyl ether compositions. A further object of the instant invention is to improve the color stability of polyphenyl ether compositions. Other objects and advantages of this invention will be apparent to those skilled in the art from the following disclosure.

It has now been found that the polyphenyl ether compositions can be further improved by treatment thereof with a metal from the group of finely divided copper, e.g. copper powder, or alkali metals, e.g. lithium, sodium and/or potassium, at a temperature of from above the melting point of the alkali metal, preferably above about 100° C. to about 280° C., with suitable ranges e.g. from about 150° to 170° C., from about 220° to 240° C., etc., over a time period of from several hours, or from about 4 to about 10 hours, or longer and each of the classes of metals (i) alkali metals, or (ii) copper, is employed in the absence of the other. Sufficient copper or alkali metal is employed such that a portion of such material is present in the mixture at the conclusion of the treatment period. Generally the order of from about 0.25 to about 3.5 weight percent of sodium, or from about 0.25 to about 2 weight percent of copper, based on the weight of the polyphenyl ether composition to be treated, is sufficient. Corresponding equivalent amounts of other alkali metals based on the ratio of their atomic weight to the atomic weight of sodium can be employed, thus on a weight percent basis, less lithium (0.3×weight sodium) and more potassium (1.70×weight sodium) would be required for a generally equivalent effect. During the treatment period the mixture is agitated in a manner to maintain the copper powder or alkali metal material suspended in a substantially uniform manner throughout the polyphenyl ether composition. Following said treatment the mixture is filtered to remove the suspended solids, including the excess copper powder or alkali metal. The filtrate is then fractionally distilled to recover the desired polyphenyl ether composition. A minor amount of the forerun and tailings in the fractional distillation may be separated from the balance of the polyphenyl ether composition and may be combined with cuts from the treatment of similar compositions to recover a portion of such material. Normally not more than 5 weight percent of the filtrate is removed from the composition in such cuts.

It will be understood that specific components of mixed polyphenyl ether compositions can be separately treated by the present process and then mixed in any desired ratio to form the final composition. This procedure has the advantage that any cuts removed in the distillation process would not materially alter the specific treated composition and could not alter the component ratio of any desired final formulated composition.

The polyphenyl ether compositions can be further improved by treatment with a decolorizing agent such as charcoal, diatomaceous earth, Attapulgus earth, and/or alumina by suspending such agents therein with subsequent filtration to remove the solids. Similarly the polyphenyl ether compositions can be passed through one or more columns of the aforesaid materials. Whereas the polyphenyl ethers can be mixed with aromatic solvents, e.g. benzene, toluene, xylene, etc., to improve the fluidity of the composition in passing through such columns, with subsequent removal of such solvents, it is generally preferred that such increased fluidity be effected by heating the polyphenyl ether compositions, for example, to temperatures of the order of about 65° C. to about 100° C., or higher, either before or during treatment by suspending the aforesaid materials therein or by passing the compositions through a column of the aforesaid materials, which columns can be maintained at such elevated temperature by wrapping with an electrical heating element or other suitable means.

The polyphenyl ether compositions treated by the process of this invention have been found to have improved oxidation resistance, improved color stability and reduced corrosive action as hereinafter more fully shown. A further advantage of the process of this invention is that the polished metal discs employed in the oxidation stability tests generally remained bright throughout such tests whereas the untreated compositions often rendered such metal discs dull in appearance.

The improved polyphenyl ether compositions of the present invention are useful as functional fluids particularly at elevated temperatures, for example, as synthetic lubricants for jet engines, as hydraulic fluids and lubricants for supersonic aircraft and missiles, as coolants for electronic equipment, as dielectric materials for use in the preparation of insulating elements for use in various electrical apparatus such as electrical capacitors, as coolant-moderators and heat-transfer agents for nuclear reactors, and the like.

The following examples are illustrative of the polyphenyl ether treatment process of the instant invention.

EXAMPLE 1

A mixed polyphenyl ether composition prepared by the reaction of potassium m-phenoxyphenoxide and potassium p-phenoxyphenoxide, in a mole ratio of 4:1 and in a combined amount of a small excess over 1 mole, with 0.5 mole of m-dihalobenzene was evaluated by vapor phase chromatographic analysis and found to consist of about 63.8 weight percent of m-bis(m-phenoxyphenoxy)benzene, about 32.8 weight percent of m-(m-phenoxyphenoxy)phenyl p-phenoxyphenyl ether, and about 3.4 weight percent of m-bis(p-phenoxyphenoxy)benzene.

A 205-g. sample of the above polyphenyl ether composition was charged into a 500-ml., round-bottom flask and heated to about 220° C. Then 1 g. of copper powder was added thereto and the mixture agitated by stirring for a period of about 6 hours while the temperature was maintained between about 220° and about 240° C. The mixture was then cooled to below 100° C. and filtered through a bed of Attapulgus earth on a Celite filter precoat. The filtrate was distilled through an 11-inch Vigreux column and the yellow colored fluid boiling at 286° to 291° C./0.8 mm. recovered. This fluid was again filtered through a bed of Attapulgus earth on a Celite filter precoat and the light yellow colored filtrate was found to have a refractive index of $n_D^{25}$ 1.6301.

EXAMPLE 2

A 251-g. sample of the untreated polyphenyl ether composition of Example 1 was charged into a 500-ml., round-bottom flask and 3 g. of metallic sodium was added thereto. The mixture was heated to 230° and the temperature maintained between about 230° and about 240° C. for a period of about 6 hours during which time the mixture was agitated by stirring. The mixture was then cooled to below 100° C. and filtered through a bed of Attapulgus earth on a Celite filter precoat. The filtrate was distilled through an 11-inch Vigreux column and the fraction boiling at 263° to 267.5° C./0.25 to 0.3 mm. recovered. This fluid was again filtered through a bed of Attapulgus earth on a Celite filter precoat and the light straw colored filtrate was found to have a refractive index $n_D^{25}$ 1.6301.

EXAMPLE 3

The untreated polyphenyl ether composition of Example 1, the copper-treated product of Example 1, and the sodium-treated product of Example 2, respectively 22.71-g., 23.05-g. and 22.60-g. samples, were then subjected to oxidation conditions by bubbling 1 liter/hour of dry air through the samples at 600° F. for 48 hours in the presence of polished metal discs of magnesium, aluminum, copper, stainless steel, titanium, and silver. Then unoxidized and oxidized samples of each of the three materials were evaluated by determining their viscosity in centistokes at 100° F. and 210° F., essentially according to procedure ASTM—D445—53T, with the following results:

|  | Untreated control | Copper treated | Sodium treated |
| --- | --- | --- | --- |
| Percent weight loss during oxidation test | 0.88 | 0.74 | 0.66 |
| Viscosity 100° F. (before) | 357.5 | 357.4 | 363.3 |
| Viscosity 100° F. (after) | 602.6 | 593.4 | 583.4 |
| Percent viscosity change | 68.5 | 66.1 | 60.6 |
| Percent improvement treated material |  | 3.6 | 13.0 |
| Viscosity 210° F. (before) | 13.02 | 13.10 | 13.17 |
| Viscosity 210° F. (after) | 16.45 | 16.37 | 16.23 |
| Percent viscosity change | 26.4 | 25.0 | 23.2 |
| Percent improvement treated material |  | 5.6 | 13.8 |

From the percent improvement of the treated material over the untreated material, i.e. the difference in percent viscosity change between the treated and untreated material based on the treated material, it will be seen that both the aforesaid copper treatment (Example 1) and alkali metal treatment, such as sodium (Example 2), effected small, but definitely improved oxidation stability to the polyphenyl ether compositions.

Additionally after a period of several months storage it was observed that the composition treated with copper powder (Example 1) became a brighter yellow color, and the composition treated with sodium metal (Example 2) became a somewhat darker straw color, whereas the untreated composition became a much darker yellow color than either of the treated compositions. Accordingly, it is seen that the process of the instant invention also effects a marked improvement in color stability of the polyphenyl ether compositions.

EXAMPLE 4

Another mixed polyphenyl ether composition was prepared and consisted primarily of a mixture of the order of about 57 weight percent m-bis(m-phenoxyphenoxy)benzene, about 38 weight percent m-(phenoxyphenoxy)phenyl p-phenoxyphenyl ether, and about 5 weight percent m-bis(p-phenoxyphenoxy)benzene. A 423-g. portion of this composition was treated with about 2 weight percent of copper powder for about 9 hours at about 150 to 160° C. in a similar manner to that set forth in Example 1, and the untreated and treated compositions each were subjected to the oxidation and corrosion test, with the following results—the treated composition was found to have a 45 percent improvement in oxidation stability over the untreated composition, as indicated by the corresponding percent viscosity changes before and after the accelerated oxidation tests, and the treated composition was found to have a value of 0.13 in the copper corrosion test in comparison with a value of −0.96 for the untreated composition. Accordingly, this example further demonstrates the utility of the disclosed process to improve the oxidation stability and reduce the corrosive activity of polyphenyl ether compositions.

Whereas copper powder is generally preferred in the above-described process, as having a large surface area in relation to the weight of copper employed, other relatively finely divided forms of copper can also be employed, e.g. granulated copper, small copper beads, copper turnings, copper chips, and the like.

Additionally the process of this invention can be made continuous by passing a preheated polyphenyl ether composition through a series of heated packed columns containing copper, preferably in the larger particle size, e.g. copper turnings and copper chips, or in the case of the alkali metals passing the polyphenyl ether composition counter-currently thereto. The packed columns preferably are supported on a filter bed media to retain any salts formed in the purification process. Since the system is held at a temperature above the melting point of the alkali metal, it may be desirable to gradually add additional alkali metal to one or more of the columns. As the process continues, the first packed column periodically is taken out of service and a fresh, packed column introduced as the last member of the series, whereby each column advances from last to first in order to provide the last columns in a relatively fresh condition at all times. The polyphenyl ether composition can be filtered and reheated, if desired, after passage through each of the columns in the series and prior to introduction into the next column of the series. In this regard the polyphenyl ether composition can be cooled to effect the solidification of any alkali metal therein prior to filtration and the polyphenyl ether composition reheated to the desired temperature before introducing into the next column of the series. Accordingly, it will be apparent that many minor variants can be employed in the aforesaid continuous process.

It should be recognized that the forced passage of large volumes of air (1 liter/hour) through a relatively small volume of the polyphenyl ether compositions (about 20 ml.) at the high temperature of 600° F. is generally far more severe than would be encountered in the actual use of such compositions as functional fluids and lubricants, since normal use would be in an essentially closed system, whereby the compositions would not be exposed to large volumes of air in relation to the volume of such compositions.

It will be apparent to those skilled in the art that the process of this invention should be carried out in a closed anhydrous system to reduce the hazards of handling the molten alkali metals.

I claim:
1. A process of treating a polyphenyl ether composition to improve the oxidation resistance thereof at elevated temperatures comprising heating a polyphenyl ether composition selected from the group consisting of (a) polyphenyl ethers having the structural formula

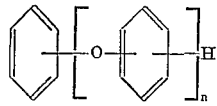

wherein $n$ is an integer from 2 to 9, (b) hydrocarbyl derivatives of said polyphenyl ethers wherein the number of carbon atoms in a single hydrocarbyl radical bonded to an aromatic nucleus of the polyphenyl ether does not exceed 12 and the total carbon atoms in the sum of the said hydrocarbyl radicals does not exceed 25, and (c) mixtures of said polyphenyl ethers of (a) and (b); each in the presence of a metal selected from the group consisting of (i) an alkali metal, or (ii) copper, wherein the copper is present in a finely divided form, and each metal of the classes (i) and (ii) in the absence of the other, in an amount such that a portion of the alkali metal or finely divided copper remain in the system at the end of the process, at a temperature of from the melting point of the alkali metal to about 280° C., and separating the treated fluid polyphenyl ether composition from any suspended solids.

2. The process of claim 1, wherein the alkali metal is a mixture of alkali metals.

3. The process of claim 1, wherein the alkali metal is sodium.

4. The process of claim 1, wherein the alkali metal is lithium.

5. The process of claim 1, wherein the alkali metal is potassium.

6. The process of claim 1, wherein the metal is copper.

7. The process of claim 1, wherein the alkali metal is present in an amount of from about 0.25 to about 3.5 weight percent, based on sodium, or equivalent amounts of other alkali metals based on the ratio of their atomic weight to the atomic weight of sodium, or the finely divided copper is present in an amount of from about 0.25 to about 2 weight percent, each based on the weight of the polyphenyl ether composition, the treatment temperature is from about 220° C. to about 240° C., the alkali metal or finely divided copper is suspended in a substantially uniform manner by agitation during the treatment period, the treated mixture is filtered to remove any solids, and the filtrate is fractionally distilled under reduced pressure, and wherein a minor amount of the forerun of such distillation of the filtrate is separated from the balance of the polyphenyl ether composition recovered thereby.

8. The process of claim 1, wherein the polyphenyl ether composition is filtered at a temperature of from about 65° C. to about 100° C. and said composition is treated by contact with a decolorizing agent selected from the group consisting of charcoal, diatomaceous earth, Attapulgus earth, alumina, and mixtures thereof.

9. The process of claim 1, wherein an unsubstituted polyphenyl ether composition of (a) is employed and at least about 50 percent of the total ether linkages in the polyphenyl ether composition are meta-linkages.

10. The process of claim 9, wherein $n$ is an integer from 3 to 6.

11. The process of claim 9, wherein $n$ is an integer from 3 to 4.

12. The process of claim 1, wherein the carbon atom bonding any hydrocarbyl radical to said aromatic nucleus of the polyphenyl ether of (b) is a tertiary carbon atom and at least about 50 percent of the total ether linkages in the polyphenyl ether composition are meta-linkages.

References Cited

UNITED STATES PATENTS 3,240,817    3/1966    Carlson _____ 260—613

BERNARD HELFIN, *Primary Examiner.*